(12) United States Patent
Alvite

(10) Patent No.: US 8,089,167 B2
(45) Date of Patent: Jan. 3, 2012

(54) ROBOT GRAVITY-BASED ELECTRICAL GENERATOR

(76) Inventor: Joseph Alvite, Mounds View, MN (US)

( * ) Notice: Subject to any disclaimer, the term of this patent is extended or adjusted under 35 U.S.C. 154(b) by 548 days.

(21) Appl. No.: 12/313,557

(22) Filed: Nov. 20, 2008

(65) Prior Publication Data

US 2009/0127864 A1 May 21, 2009

Related U.S. Application Data

(60) Provisional application No. 61/003,817, filed on Nov. 20, 2007.

(51) Int. Cl.
*F02B 64/04* (2006.01)
(52) U.S. Cl. .......................................... 290/1 C; 290/1 R
(58) Field of Classification Search .................. 290/1 C, 290/1 R, 42–44, 53–55
See application file for complete search history.

(56) References Cited

U.S. PATENT DOCUMENTS

| | | | | |
|---|---|---|---|---|
| 4,441,030 A * | 4/1984 | Bellamy | ........................ | 290/53 |
| 4,675,536 A * | 6/1987 | Bellamy | ........................ | 290/42 |
| 5,324,988 A * | 6/1994 | Newman | ........................ | 290/54 |
| 7,239,037 B2 * | 7/2007 | Alstot et al. | .................... | 290/54 |
| 7,329,962 B2 * | 2/2008 | Alstot et al. | .................... | 290/54 |
| 7,825,532 B1 * | 11/2010 | Barber | ........................ | 290/55 |
| 7,911,073 B2 * | 3/2011 | Smith | ........................ | 290/53 |
| 7,944,066 B2 * | 5/2011 | Cole | ........................ | 290/42 |

\* cited by examiner

*Primary Examiner* — Thanh Lam
(74) *Attorney, Agent, or Firm* — Paul J. Robbennolt

(57) ABSTRACT

A robotic gravity-powered generator includes two containers, one containing fluid with an inflatable bag and attached weight immersed in the fluid, and the second containing a generator. A pneumatic pump inflates the bag, permitting it to float to the top of the first container; the bag is then deflated, and moves down through the fluid due to the force of gravity. The movement of the bag up and down is converted to rotary force which operates the generator, thereby generating electricity.

5 Claims, 2 Drawing Sheets

ROBOT GRAVITY-BASED ELECTRICAL GENERATOR

CROSS-REFERENCE TO RELATED APPLICATION(S)

This application claims the benefit of U.S. Provisional Application No. 61/003,817, filed Nov. 20, 2007, entitled "Robot Gravity Generator and the Electricity Producing Robot Farm" by Joseph Alvite, the entire contents of which are incorporated herein by reference.

FIELD OF THE INVENTION

The present invention relates generally to a robotic generator producing electricity, actuated by the force of gravity using time-proven principles and laws. The present invention is an ecological automated robot that can be used as a stand-alone electricity-producing automated machine or as multiple robots working together used for mass production of electricity. The invention thus provides a cost effective, sustainable energy-producing robotic machine.

BACKGROUND OF THE INVENTION

Electricity is an essential part of modern life. However, most current methods of producing electricity are not ecological. They produce pollution that contributes the gasses that create the greenhouse effect, the end result of which is global warming, that manifest into violent sea storms as never experienced before, devastating local infrastructures and economies and killing thousands of people. The global warming problems are resulting in severe climate changes that, if not stopped soon, can bring abrupt and irreversible dangerous climate changes.

The largest contributing source of greenhouse gasses is the burning of fossil fuels leading to the emission of carbon dioxide, nitrous oxide, sulfur hexafluoride, hydro fluorocarbons, perfluorocarbons, methane and chlorofluorocarbons, all these compounds are damaging the environment. Fossil fuel burning power stations and fossil fuel processing and distribution contribute to more of 64% of the greenhouse gasses.

Nuclear power plants producing electricity are not the solution. These old nuclear power stations are creating a different kind of environmental problem. These nuclear power stations continue to accumulate and are stock piling toxic waste that will last thousands of years at the tune of more than 1,700 tons of nuclear waste annually, compounds of extreme danger and insecurity. Decommissioning of current nuclear plants is costly and create a very real danger of another nuclear power accident such as another 3-mile island or a terrorist attack.

According to the Kyoto accord, with the exception of the United States, India and China, which are the worst polluters, all other nations of the world agree that we need to reduce or eliminate greenhouse gasses because global warming is unequivocal, and the buildup of carbon dioxide should stop. The problem is that everybody in all undeveloped and developed countries wants and need more and more electricity.

The United States is rushing to supplement gas shortages with ethanol, turning one third of the US acreage of America's bread basket to the production of ethanol. The result is shortages of grain in the world market, so the choice now is fuel or food.

The people of China and India have a rich diet and as their economies are expanding and energy use is surging and their industrialization moves forward regardless of the toll to the environment.

This invention is a robotic generator that produces electric energy and is actuated by gravity forces and the Archimedes principle working under fluids; the amount of electricity produced by this robotic apparatus is dependent on size. The following formula values can be tailored to make a small or large robotic gravity generator: $V = A \times M \times N$ This robotic generator is an ecological automated robot that can be used as a standalone electric power producing unit. The robotic generator can be small in size to supply electric power to a small building or a single family household, or this robotic generator can be made as large size units and can be assembled in multiple large units working together to produce large amounts of electricity.

This robotic gravity generator can resolve many of the current environmental problems the world is facing. Since it does not produce any greenhouse gasses and can eliminate the power grid problems utilities have since power outages due to down power lines due to storms or hurricanes or other weather related problems can be reduced if not eliminated. This robotic gravity generator is a self sufficient stand alone electric producing apparatus.

BRIEF SUMMARY OF THE INVENTION

This invention is a robotic generator actuated by the forces of gravity, the Archimedes principle and Faraday's laws of electromagnetic induction.

This robotic generator is an ecological automated robot that can be used as a standalone electric power producing unit. The robotic generator can be small in size to supply electric power to a small building or a single family household, or this robotic generator can be made as large size units and can be assembled in multiple large units working together to produce large amounts of electricity. This is a sustainable alternative energy producing machine.

The robot is contained in two boxes: one box is the motive force and is full of fluid and the second box contains the generator, the gear box, the controls, pneumatic pump, inverter, battery charger and the energy storage in the form of batteries or fast charging and fast release capacitor bank.

The box full of fluid contains the gravity chamber, the Archimedes air bag assembly, the mechanical assembly that controls the gravity and Archimedes air bag and the mechanical motion assembly that transforms the linear travel force into rotational torque or force as well as the electromagnetic stop assemblies and the shock absorber control devices, sensors hoses and wiring.

All these devices work together to provide the force to move the power shaft rotation to power the gear box which manages the speed to the shaft of the generator with the rotational power to allow Faraday's law of electromagnetic induction to work since the generator has a long coiled wire assembly on its shaft surrounded by north pole and south pole magnets, when the shaft and rotor is turned and as the shaft inside the generator turns an electric current is converting mechanical, moving energy into electrical energy, this electricity can be used directly by electric appliances or be sent to the electric grid or it can be stored into batteries or capacitor banks.

In operation, the generator uses gravity as a source of power. When air is removed from the inflatable bag via an air control valve, the bag collapses due to the weight located on top of the bag and the bag assembly drops downward to the bottom of the container due to the weights. Thus, gravity produces usable force to power the generator since the bag assembly is attached to the motive force assembly. The weights can be internal or external to the fluid chamber. when the bag assembly is at the bottom of the chamber, it is reinflated using a pneumatic pump, air compressor, or other means. As the bag floats to the surface of the fluid chamber, it again produces usable force to power the generator. The vertical forces are transformed to rotational force using means such as a ball screw or endless rack and pinion. The rotational force thus drives the generator shaft. The rotational shaft is rotating clockwise and counter clock wise as the gravity and the Archimedes assembly move up and down and these motions are delivered to the gear box where the motions are transformed to be in only one direction and an optimum speed for the electromagnetic induction to take place.

The inflatable bag is inflated and deflated by an air control valve and pneumatic controls, controlled by the computer. The inflatable bag can be a bellows type or a metal collapsing container to be inflated or deflated as needed, or can be another bag known in the art. The inflatable bag may contain a quick air release valve.

A computer that monitors and controls all the mechanical and sensor functions of the fluid chamber, the generator and the output and distribution of electricity and the electrical storage system and gives a real time display of the status, performance, input and output of the gravity robotic generator.

The generator of the invention can be used in series or in parallel as a robot electricity producing farm.

30.

DETAILED DESCRIPTION

Figure 1:
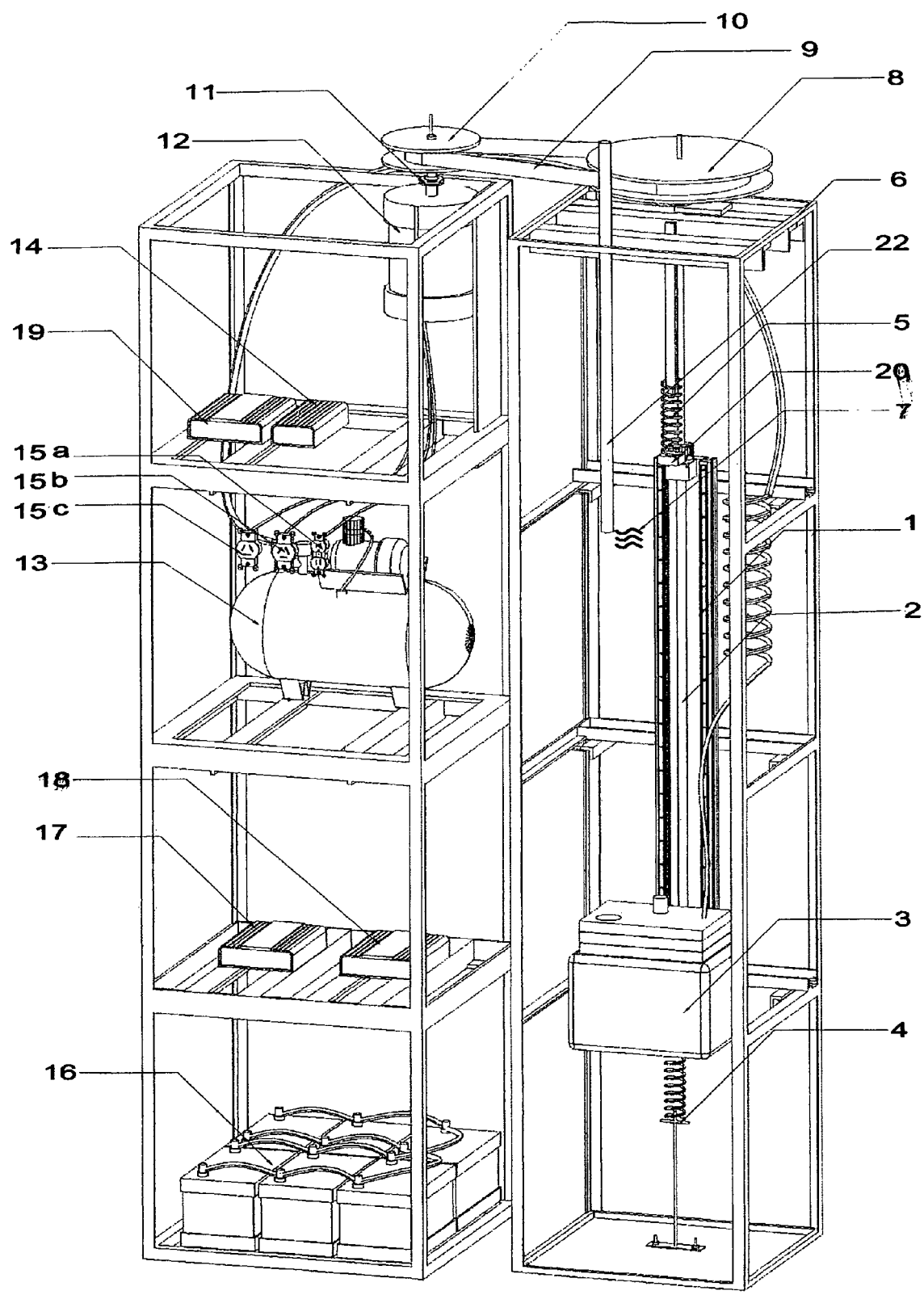
FIG. 1 is an exploded detailed view of the invention.
Figure 2:
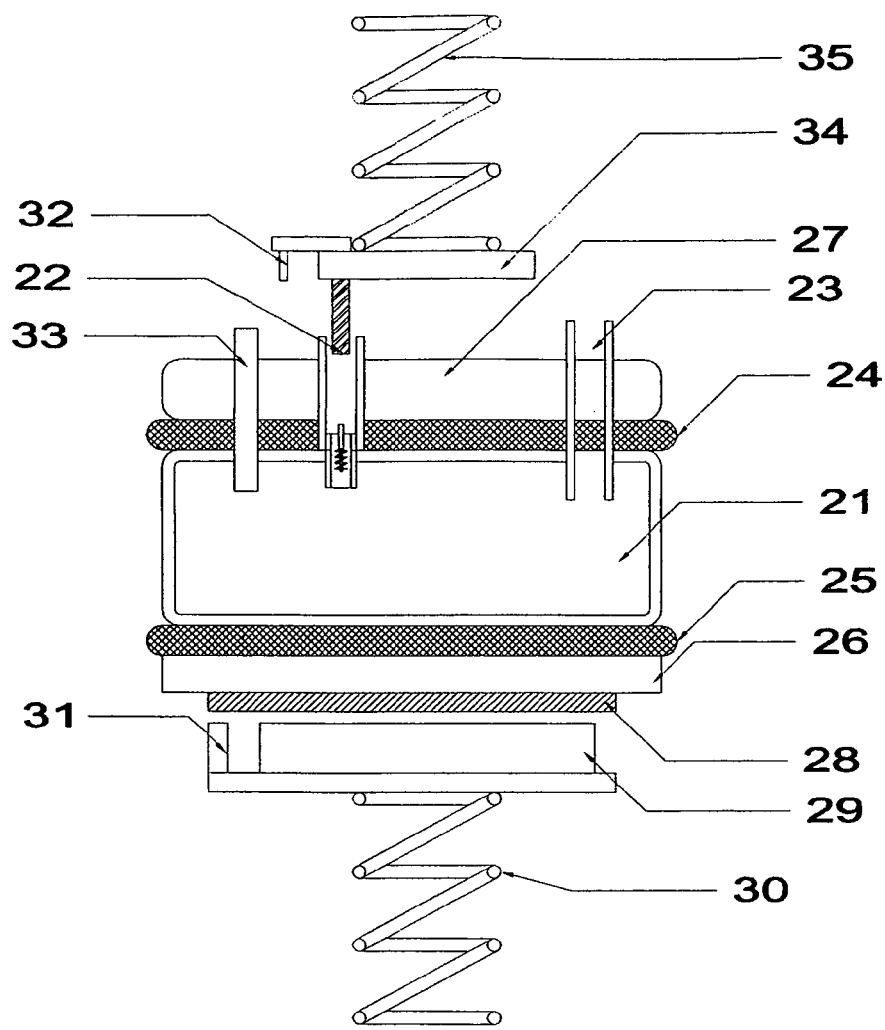
FIG. 2 is an exploded detailed view of the Archimedes bag and related components of the invention.

With reference to the two Figures, it is to be understood that like components are labeled with like numerals throughout according the present invention figure number one which are the two boxes containing all the components that make this invention work, figure number two is the figure showing the components which describe the Archimedes bag.

This invention is a robotic generator actuated by the forces of gravity using time proven principles and laws. This generator produces electricity and is an ecological automated robot that can be used as a standalone electricity producing automated machine or as multiple robots working together used for mass production of electricity, this robotic generator is a cost effective, sustainable energy producing machine since uses no fuel.

The gravity robot generator uses 3 main time-proven principles and laws which are the following: 1) Gravity; 2) The Archimedes principle; and 3) Faraday's laws of electromagnetic induction.

1.—Gravity. Gravitational force or gravity depends of the masses of two bodies, Gravitational force is expressed as (G*m1*m2*) 1d* Where G is the gravitational constant m1 and m2 are the masses of two objects for which are calculating force and d is the distance between the center of gravity of the two masses.

2.—The Archimedes principle says that: "Any object, wholly or partly immersed in a fluid, is buoyed up by a force equal to the weight of the fluid displaced by the object."

When the rack and pinion or ball screw assembly travels down into the sealed container full of fluid, it is sinking because of the weight of the assembly, at this point we can call the motive mechanism and this mechanism can be a rack and pinion or ball screw assembly and this motive mechanism can be negatively buoyant, when the air bag is partially filled with air or other gasses and the air volume is almost as equal as the displacement of the overall weight of the rack and pinion assembly and the air is controlled by the computer at this point we can call the rack and pinion or ball screw assembly neutrally buoyant and when the air bag is full of air we can call the rack and pinion or ball screw assembly positively buoyant and the rate of the floatation speed can be calculated depending on the size and weight of the rack and pinion assembly in relation to the size of the air container or air bag.

Also by controlling the neutrally buoyant and positively buoyant air/gas process, this can be an effective and efficient braking system so the generator assembly will not crash reaching the bottom or top of the end of travel. To play it safe the assembly has a spring and electromagnetic brake system up and down.

The air is produced by an air compressor and to be able to compensate the volume needed to make the buoyancy assembly neutrally buoyant in the case of large machines the positively buoyant a large volume of air needs to be produced and this is not efficient because it will take time and volume to reach the desired result, to reduce the need for such as large volume of air needed the development of a counter weight was developed similar to the workings of a balance (weight versus counter-weight equals a balance load) this assembly then is similar to the workings of an elevator making the generator assembly almost but not quite neutrally buoyant, at this point we can calculate the weight needed to control the optimum speed of the generator assembly going down the travel, then by the use of the elevator with the counter-weight the volume of air needed to make the generator assembly neutrally buoyant or to make the generator assembly positively buoyant is very small in relation to the generator assembly without the counter-weight.

3.—Faraday's laws of electromagnetic induction. Michael Faraday in 1831 discovered that if an electric conductor like copper wire, is moved through a magnetic field, electric current will flow or be induced in the conductor so the mechanical energy of the moving wire is converted into electrical energy.

Figure one, in this embodiment the generator describes the two boxes, the fluids box and the controls box, in the fluids box we find like number 1 is the linear guide assembly, this linear guide assembly contains a base where two rails are bolted to the base and two ball bearing riding bases ride in such said rails, on the riding bases is a platform bolted to said riding bases, this platform is attached to item number 2 which is the screw ball assembly, this screw ball assembly is comprised of the screw shaft and the screw nut where the balls are in recirculation as the screw shaft moves up or down, item number 3 is the Archimedes bag assembly which provides the up and down motions and the force this item will be described in more detail in drawing number 2, item number 4 is the bottom shock absorbing assembly and bag retaining system which has the following; a spring to take some of the shock as the bag hits it, the bag retention unit in the form of a pneumatic gripper or an electromagnet, item number 5 is the top shock absorbing assembly and bag retaining, which has the following; a spring to take some of the shock of the air bag traveling upwards, and the mechanical bag retaining system in the form of a pneumatic gripper or an electromagnet as well as a sensor to sense if the bag is present or not, item number 6 is the fluids box that contains the fluid and all the gravity assemblies, item number 7 is the fluids which contain the following, water, antifreeze/coolant liquid and the lubricants, item number 8 is the pulley belt that is attached to the ball screw shaft and is the wheel that transfers the torque and force that produced by the fluid box, item number 9 is the belt that transfers the force/torque from the fluids box to item number 10 which is the generator pulley, this pulley transfers the force/torque to the gear box assembly which is item number 11, this gear box optimizes the torque/force to an optimum shaft speed, it also monitors and changes gears as the ball screw shaft rotates clock wise or counter clock wise and provides the generator shaft with only one continuous direction, item number 12 is the generator assembly which is the item that converts the mechanical high rotational speed to electrical energy, this is also called Faraday's law of electromagnetic induction and it is produced by a shaft assembly containing a large quantity of copper wire rotating at a high speed this shaft and coiled cooper wire is spinning inside large magnets and converts the mechanical speed into electricity this electricity then can be sent to the human interface panel or to the electrical utility grid or to the electrical storage system located at the bottom of the controller box, item number 13 is the air compressor, this air compressor provides the air to the Archimedes bag and to the grippers which retain the bag as needed, item 14 is the pneumatic control box and solenoid assembly, this pneumatic controls box controls the filling of the air going into the Archimedes box and the grippers, rational optimum speed from the gear box, 15a, 15b, 15c are the human electrical interface the wiring harness comes from a bifurcated cable, one wiring harness goes to the human interface panel and the other wiring harness goes to the house electrical control panel and the electrical storage bank, from the human interface panel the user can choose to use the power that may be needed, 15a provides 120 volts at 30 Amp, 15b provides 120/240 a 20 Amp, 15c provides 120 volts a 20 Amps these are protected circuit breakers, item 16 is the electrical storage system which is comprised of two systems, one is the wet battery bank and the other is the capacitor fast charging, fast discharging electrical system, item number 17 is the electrical inverter, this inverter conditions the electrical output into other voltages so the electricity can be used at the voltage required, item number 18 is the energy charger, item number 20 is the computer control box which controls the electromagnets, sensor array, and monitors and displays the data of the sensors and the motions of the gravity robot.

Figure two is the Archimedes bag, in this embodiment item number 21 is the rubber container and associated devices that make it work, Item number 22 is the air input valve which is how the air is piped in to blow the air bag, Item number 23 is the air release valve, this valve is used to allow the air to be evacuated when is no longer needed and is sensed and controlled, Item number 24 is the air bag top assembly where the monitor air sensor and the air valve and the air input valve, Item number 25 is the air bottom plate and base to support the air bag, Item number 26 is the ball slide platform where the air bag assembly is bolted and supports the weights as well as the assent of the air bag as it floats upward, Item number 27 steel weights these weights are the propelling force downward or gravity and are calculated to provide the right velocity and force as the air bag travels to the bottom of the fluid container, Item number 28 steel plate bottom is a steel plate for the sensor to feel that the bottom of the air bag has reached the bottom destination and the gripper can retain the assembly ready to evacuate or fill the bag as required, Item number 29 bottom electromagnet, this bottom electromagnet or pneumatic gripper is used to hold the air bag as it is filled with air then released as the bar is full of the calculated air to propel the bag upwards at the right speed and force, Item number 30 shock absorber bottom this shock absorber takes the force of the weighs as the assembly reaches the bottom of the container and controls the descent of the air bag assembly Item number 31 bottom sensor, this sensor is located at the base of the shock absorber unit to sense when the air bag assembly has reached the bottom of the container and reports the status to the computer control system Item number 32 top sensor, this sensor is located at the top of the shock absorber unit to sense when the air bag assembly has reached the top of the container and reports the status to the computer control system Item number 33 air pressure sensor senses the actual value of the amount of the air in the air bag and reports its value to the computer control and the front man interface display unit, Item number 34 top electromagnet, this top electromagnet or pneumatic gripper is used to hold the air bag as it is the air is released to propel the bag downwards at the right speed and force, Item number 35 top shock absorber spring this shock absorber takes the force of the weighs and the rest of the air bag assembly as the assembly reaches the top of the container and controls the ascent of the air bag assembly.

The gravity generator requires an initial electrical power to run the onboard computer sensors and air pump, to initiate the motions of the generator this initial electrical need, comes from the battery or capacitor bank located at the bottom of the gear box and generator assembly, or also can be provided by an external electrical power source.

Other Embodiments of the Gravity Generator

Embodiment A

Describes an elevator box traveling up and down inside of a long vertical container full of fluids and attached to guide ways, a sealed box containing the generator assembly inside the elevator box, the container box is full of fluid, the pinion gear and shaft exits the side wall of the elevator box, and elevator assembly has a counter balance. The motive force is gravity, force of the weight of the elevator box to go down and up moving the pinion gear on the stationary endless rack and to go up is the air in the air bag, when the elevator reaches the top the air bag is collapsed by allowing the air to escape to the atmosphere and then the weight of the elevator box propels the box to go to the bottom of the container, as the pinion gear is rotating as the elevator box is traveling up or down the gear is attached to the shaft that is providing the force to rotate the shaft that goes to the gear box and the rotation is transformed in only one direction allowing the electromagnetic induction to take place, the electricity can then be sent via an umbilical cord containing the wiring and pneumatic hoses and support wiring to a panel to be used as needed, the elevator box has all the equipment needed to fulfill the support of the generator such as the gear box, the pneumatic pump can be internal or external to the elevator box, the control box will be external to the elevator box.

Embodiment B

Describes an electric producing machine that travels up and down, the down travel is powered by the gravity force provided by the weight of the elevator box which contains the generator, gear box, cabling. The up travel is provided by the counter weight which is full of water when the elevator reaches the bottom of the travel the water reservoir is in the up position and then the box is filled full of water providing the gravitational weight to propel the elevator traveling up and these two motions are the force to make the pinion gear to rotate because the endless gear rack is stationary, the elevator travel is controlled by slide rails, the shaft is moving at the gear box providing the right speed and velocity to the generator shaft to produce the electromagnetic induction to produce the electricity.

The pinion gear and shaft exits the side wall of the elevator, elevator assembly has a counter balance box, the motive force is gravity force of the weight of the elevator to go down and to go up the counter weight has a box which water is added to add additional weight to make the elevator go up, when the elevator reaches the top the water is expelled and the elevator assembly again has more weight and the elevator travels down.

The electricity produced can be used directly or it can be stored in a battery bank or a capacitor bank for later use, the unused electric power can be sent directly to the electrical grid or can be used by the water pump reservoir, The controls and the water pump can be external to the slide assembly.

Embodiment C

Embodiment C. describes a generator that is stationary at mid travel and a shaft and a pinion gear exits the generator, a long tube has a rack that travels up and down, the rack contacts a pinion gear which makes the generator shaft rotate as the rack travels up and down providing the mechanical force to rotate the gear that rotates the shaft, that rotates the gear box that rotates the generator shaft at high speed producing electricity. The rack has a top weight and sensor assembly and is attached to the counter weight and the container has a reservoir that fills full of water to make the rack to go up and the water is released back to be reused when the water is released the elevator weight makes the rack shaft plunge downward and as the rack reaches the bottom of the travel the counterweight container is filled of water.

The pinion gear and shaft exits the side wall of the elevator, elevator assembly has a counter balance box, the motive force is gravity force of the weight of the rack to go down and to go up the counter weight has a box which water is added to add additional weight to make the rack go up, when the rack reaches the top the water is expelled and the elevator assembly again has more weight and the rack travels down.

The electricity produced can be used directly or it can be stored in a battery bank or a capacitor bank for later use, the unused electric power can be sent directly to the electrical grid or can be used by the water pump reservoir, The controls and the water pump can be external to the slide assembly. The potential exist in the reciprocating rack variation to have one or more generators in the gravity line so when the rack moves up and down, one or more pinion gears moves a shaft or shafts producing electricity on one or two generators.

What is claimed is:

1. A gravity-powered generator comprising:
   a first container which contains fluid;
   an inflatable bag within the fluid in the first container;
   weight attached to said inflatable bag sufficient to force the inflatable bag to the bottom of the first container when it is not inflated;
   a pneumatic pump attached to the inflatable bag to inflate the bag, permitting it to float toward the top of the fluid in the first container;
   a mechanical slide to which said inflatable bag is attached to guide the inflatable bag up and down;
   means for transforming the vertical force into rotary energy;
   a second container adjacent to the first container;
   a generator inside the second container powered by the energy forces generated by the movement of the inflatable bag up and down within the fluid in the first container;
   a generator shaft connecting the inflatable bag assembly to the generator, such shaft operable to rotate by energy provided by linear up and down travel converted to rotary power by means of a ball screw or by a pinion and endless gear rack;
   a gear box inside the second container;
   controls for controlling the operation of the pneumatic pump and generator;
   controls for controlling the electrical output and electrical distribution of the gravity-powered generator; and
   energy storage in the form of batteries and or fast charging and fast release capacitor bank.

2. The gravity-powered generator of claim 1 in which the fluid contains lubricants and anti-rust agents.

3. The gravity-powered generator of claim 1 further comprising means to hold the inflatable bag at the bottom of the first container when it is inflated.

4. The gravity-powered generator of claim 1 further comprising a sensor to sense the volume and position of the inflatable bag.

5. A method for producing electricity comprising:
   inflating an inflatable bag situated within a container which contains fluid, thereby causing said inflatable bag to rise within the fluid on a mechanical slide and ball screw shaft, and thereby turning a generator shaft to create electricity;
   deflating the inflatable bag, thereby permitting weights attached to said inflatable bag to force the inflatable bag toward the bottom of the fluid on a mechanical slide and ball screw shaft, and thereby turning a generator shaft to create electricity; and
   storing or distributing the electricity created by the generator.

* * * * *